US006122366A

United States Patent [19]

Veschi

[11] Patent Number: 6,122,366

[45] Date of Patent: Sep. 19, 2000

[54] TELEPHONE WITH ENVIRONMENTALLY-INFLUENCED CALL INDICATOR

[75] Inventor: John P. Veschi, Fogelsville, Pa.

[73] Assignee: Lucent Technologies Inc., Murray Hill, N.J.

[21] Appl. No.: 09/116,504

[22] Filed: Jul. 16, 1998

[51] Int. Cl.[7] .................................................... H04M 19/02

[52] U.S. Cl. ............................................................ 379/376

[58] Field of Search .................................... 379/376, 373, 379/106.09, 79, 374

[56] References Cited

U.S. PATENT DOCUMENTS

| | | | |
|---|---|---|---|
| 4,076,968 | 2/1978 | Wattenbarger | 379/373 |
| 4,856,055 | 8/1989 | Schwartz | 379/374 |
| 4,951,311 | 8/1990 | Steer | 379/376 |
| 5,031,205 | 7/1991 | Phillips | 379/88.23 |
| 5,131,030 | 7/1992 | Cameron | 379/373 |
| 5,686,881 | 11/1997 | Ridout | 340/332 |
| 5,844,983 | 12/1998 | Lilja | 379/418 |

FOREIGN PATENT DOCUMENTS

| | | | |
|---|---|---|---|
| 6232959 | 8/1994 | Japan | H04M 1/64 |

*Primary Examiner*—Richemond Dorvil
*Assistant Examiner*—Donald L. Storm
*Attorney, Agent, or Firm*—John P. Veschi

[57] ABSTRACT

A telephone according to the invention includes an indicator adapted to provide an indication of the presence of an incoming call, and a sensor adapted to sense an environmental condition and adjust the indicator based on the sensed condition. For example, the sensor can sense an ambient light level and adjust a ringer to not ring or a speaker to mute when the ambient light level is below a threshold and/or based on an ambient noise level. In an alternative embodiment, a method of responding to a ringing signal includes the steps of sensing a level of ambient light, and adjusting an audible indicator based on the sensed level of ambient light.

14 Claims, 3 Drawing Sheets

TELEPHONE WITH ENVIRONMENTALLY-INFLUENCED CALL INDICATOR

FIELD OF THE INVENTION

The invention is directed to the field of telephony equipment, and in particular to the response of telephony equipment to incoming signals, such as ringing signals.

BACKGROUND OF THE INVENTION

When an incoming call is being received, a telephone provides a sound, such as a ringing sound, to alert people proximate to the telephone that the incoming call is being initiated, and provide these people with the opportunity to place the telephone in an off-hook condition by, for example, lifting a handset of the telephone, to thereby complete a connection and accept the call.

Conventional telephones typically provide a user with an opportunity to adjust the ringing sound. For example, some telephones allow a user to adjust the volume of the ringing sound. Other telephones allow the user to turn a ringer of the telephone off by, for example, placing a corresponding switch into an off position. In each of these examples, however, the telephone remains in the set condition until the user resets the telephone. For example, if a user of a conventional telephone manipulates a switch to turn the ringer off, the ringer will remain off until the user repositions the switch to turn the ringer on. Similarly, if a user of a conventional telephone adjusts a volume of a ringer, the volume will remain at the set level until reset by the user.

A user of a conventional telephone may forget to readjust a previous setting of the telephone based on changed conditions. For example, a user may turn the telephone ringer off when the user goes to sleep because the user does not want to be disturbed. Upon waking, however, the user may forget to turn the telephone ringer back on. Thus, the user may miss an important telephone call when the user is otherwise predisposed to accept the telephone call. Conversely, a user may forget to turn the ringer off when the user goes to sleep, and thus be awakened by the ringer associated with an incoming telephone call when the user prefers not to be interrupted. Similarly, a user may place a baby down for a nap, only to have the baby awaken prematurely due to a nearby ringing telephone. There is thus a need for a telephone with a ringer that adjusts based on the environment, such as a telephone that does not ring when it is dark.

SUMMARY OF THE INVENTION

A telephone according to the invention includes an indicator adapted to provide an indication of the presence of an incoming call, and a sensor adapted to sense an environmental condition and adjust the indicator based on the sensed condition. For example, the sensor can sense an ambient light level and adjust a ringer to not ring when the ambient light level is below a threshold. In an alternative embodiment, a method of responding to a ringing signal includes the steps of sensing a level of ambient light, and adjusting an audible indicator based on the sensed level of ambient light.

BRIEF DESCRIPTION OF THE DRAWINGS

The objects and advantages of the invention will be apparent to one of ordinary skill in the art upon review of the following description in light of the drawings, wherein.

DETAILED DESCRIPTION

Figure 1:
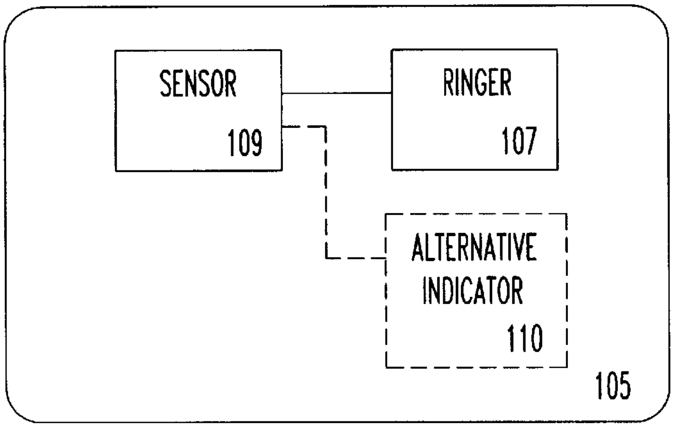
FIG. 1 is a simplified block diagram of an exemplary embodiment of a telephone according to the invention.

Telephone 105, shown in FIG. 1, includes a ringer 107 which acts as an indicator of an incoming telephone call, and a sensor 109 adapted to sense an environmental condition and adjust ringer 107 based on the sensed environmental condition. Ringer 107, in one embodiment, is a conventional ringer, except for its interconnection and dependence on sensor 109. In an alternative embodiment, an alternative indicator 110, such as a light is also employed, and the sensor 109 can enable the alternative indicator 110, for example, when disabling the ringer 107.

Figure 2:
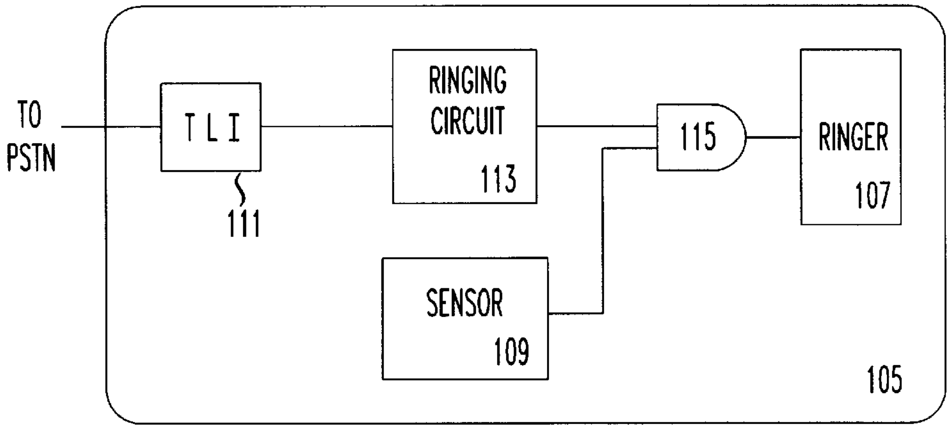
FIG. 2 is a simplified block diagram of an alternative exemplary embodiment according to the invention.

As shown in an exemplary embodiment in FIG. 2, telephone 105 is operationally coupled to a network, such as a public switched telephone network (PSTN) via a telephone line interface 111. A conventional ringing circuit 113 within telephone 105 receives ringing signals from a central office of the PSTN. In a conventional telephone, ringing circuit 113 would typically actuate ringer 107 in response to the ringing signals. In the embodiment of FIG. 2, however, AND gate 115 receives an actuating signal from ringing circuit 113, and also receives a signal from sensor 109. Thus, for example, if the inputs to AND gate 115 are both active high, the actuating signal from ringing circuit 113 will only be passed to ringer 107 when sensor 109 outputs a high signal.

Sensor 109 provides as an output signal, in a simple embodiment, either a low or a high signal, corresponding, for example, to logic zero and logic one states, respectively. Sensor 109 provides the output signal based on a sensed environmental condition. In one example, sensor 109 is a photosensor that measures a level of ambient light. Photosensors are known. A typical conventional photosensor measures a light level and produces an electrical signal the magnitude of which corresponds to the measured light level. In one embodiment according to the invention, sensor 109 compares the electrical signal to a threshold, and produces the output signal based on the comparison. For example, if the ambient light is above the threshold, sensor 109 outputs a high in response to the light level. On the other hand, if the ambient light is below the threshold, sensor 109 outputs a low in response to the light level. Thus, in this example, if the ambient light is below the threshold level, telephone 105 will not ring in response to a ringing signal from the central office.

Figure 3:
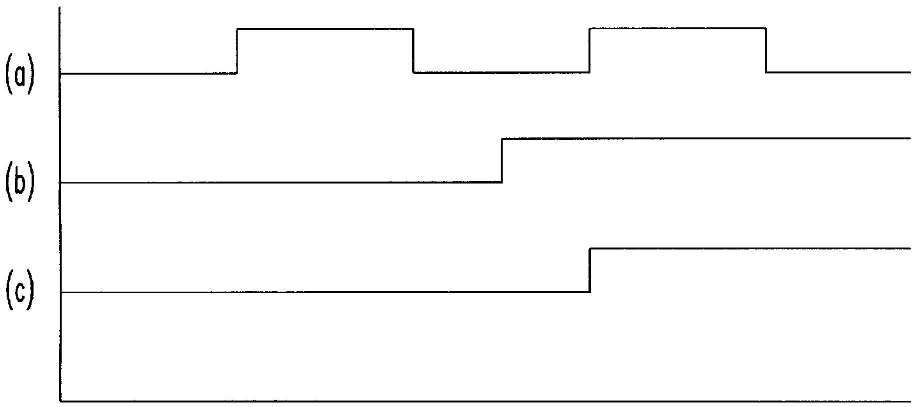
FIG. 3 is a timing diagram illustrating operation of the embodiment of FIG. 2 according to the invention.

FIG. 3 is a timing diagram illustrating this concept. Waveform (a) represents an output of the ringing circuit 113 in response to a ringing signal from the central office. Waveform (b) represents the output signal from sensor 109 at a low level when the ambient light is below the threshold, and at a high level when the ambient light meets or exceeds the threshold. Waveform (c) represents the output of AND gate 115 supplied to ringer 107, according to which ringer 107 will ring only upon the coincidence of a ringing signal from the central office and an indication that the ambient light level meets or exceeds the threshold.

Figure 4:
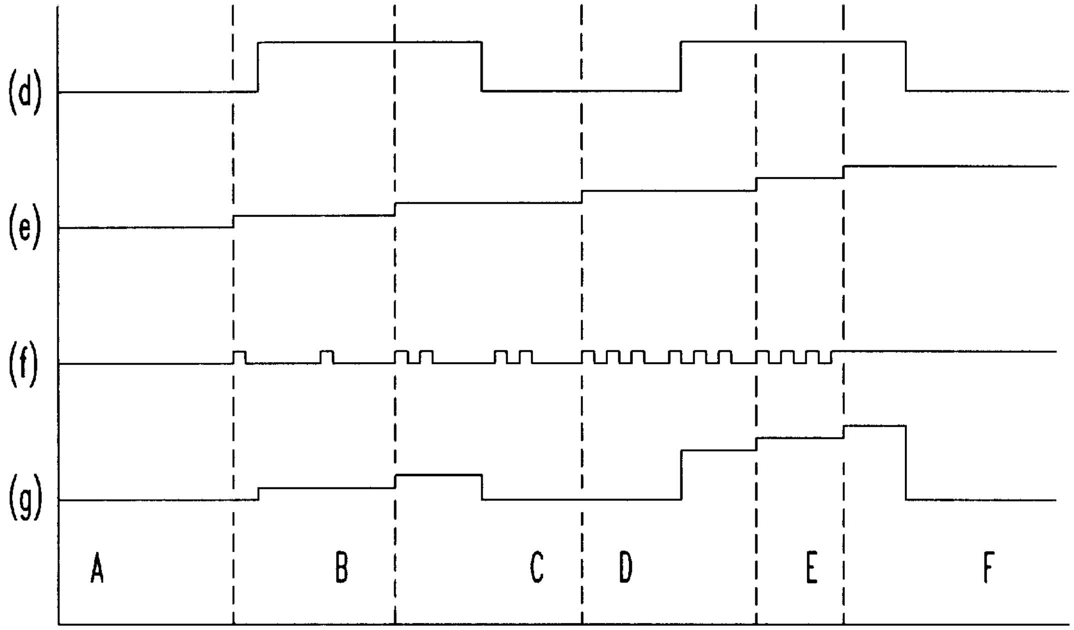
FIG. 4 is a timing diagram illustrating alternative operation of the embodiment of FIG. 2 according to the invention.

In a more complex example, sensor 109 can output a signal with a pulse density varying according to a magnitude of the sensed light. For example, multiple thresholds can be employed, with the pulse density of the output signal from sensor 109 varying based on which thresholds are exceeded. FIG. 4 shows an example where five thresholds are employed. Waveform (d) is analogous to waveform (a) of FIG. 3, representing an output of the ringing circuit 113 in response to a ringing signal from the central office. Waveform (e) represents the ambient light level thresholds as they are exceeded. Thus, for example, during period A, the ambient light is below the lowest threshold, during period B the ambient light exceeds the first threshold but is less than the second threshold, and so on until period F, during which the highest threshold is exceeded. It should be clear to one of ordinary skill that the example in FIG. 4 is purely for purposes of illustration. In practice, the level of waveform (e) will likely remain at a given level for a considerable period of time, frequently measured in hours, before transitioning to a new level.

During period A, when the lowest threshold is not met, the ringer 107 will not be activated in response to a ringing signal, as depicted in waveform (f), which depicts the output of sensor 109, and waveform (g), which depicts the ringing volume of ringer 107. During period B, however, since the first threshold is met, a low level ring will be produced by ringer 107 during the period of time for which a ringing signal is received. Similarly, the volume of the ring produced by ringer 107 varies until, as shown in period F, the ring volume is at a maximum level (when the ringing signal is being received). Thus, the volume of the ring produced by ringer 107 will be greater when telephone 105 is in a bright environment, and will be low or zero when telephone 105 is in a low light environment.

Figure 5:
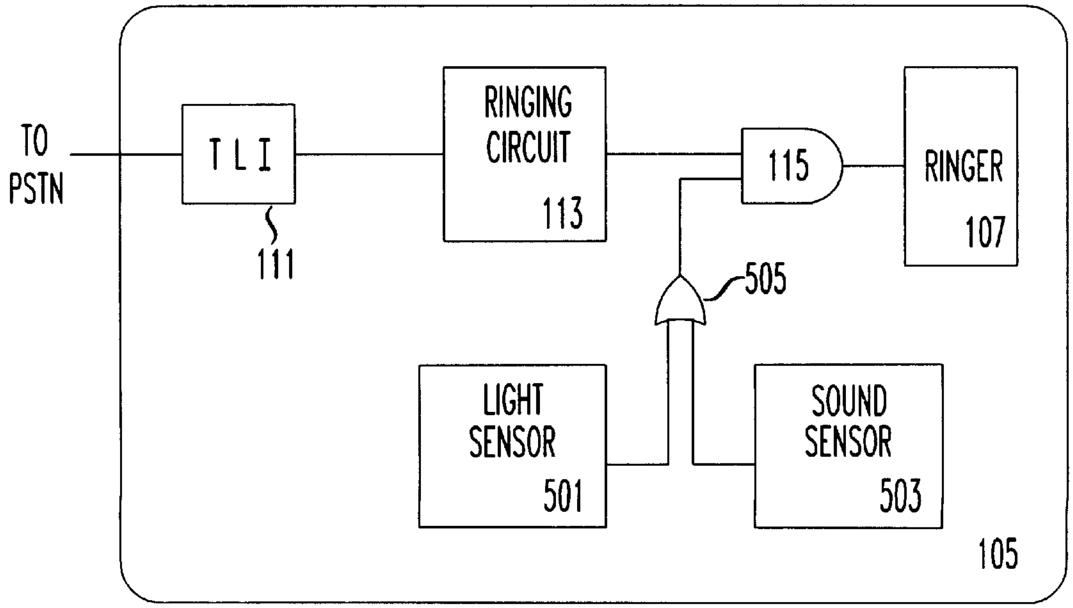
FIG. 5 is a simplified block diagram of yet another exemplary embodiment according to the invention.

FIG. 5 shows an alternative embodiment, wherein two sensors, light sensor 501 and sound sensor 503, are employed. Here, in a simple embodiment comparable to that described in FIG. 3, light sensor 501 outputs a high signal if the ambient light exceeds a first threshold, and sound sensor 503 outputs a high signal if the ambient sound exceeds a second threshold. The outputs of light sensor 501 and sound sensor 503 are input to an OR gate 505, the output of which is provided to AND gate 115. The first and second thresholds may be set, for example, so that ringer 107 will not ring in a dark and quiet environment, but will ring if it is either light or noisy. Of course, the complexity of this embodiment can be increased along the lines of FIG. 4. For example, the volume of the ring produced by ringer 107 can be controlled to increase with increased ambient noise. This feature can be employed, for example, to control the ringer 107 to always ring at a volume level a predetermined amount greater than the ambient noise level, thus increasing the likelihood that the ringing sound will be detected by a user, even in a noisy environment.

Figure 6:
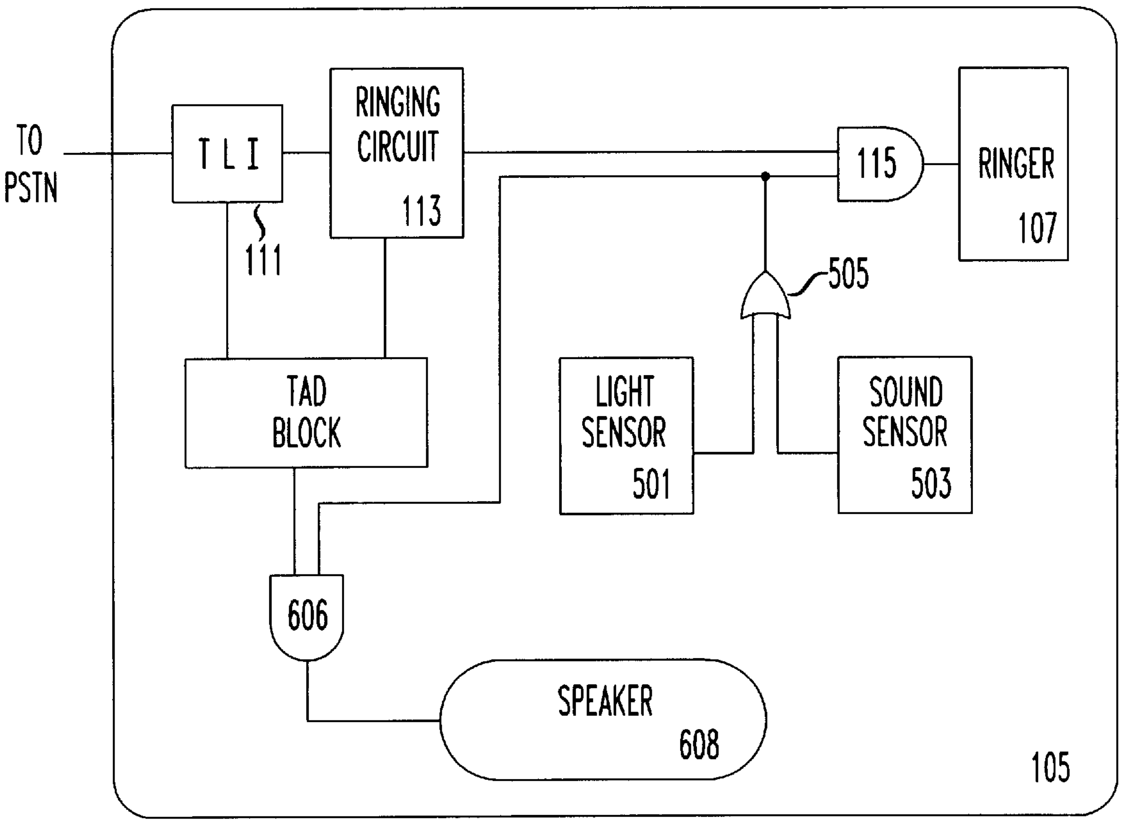
FIG. 6 is a simplified block diagram of still another exemplary embodiment according to the invention.

FIG. 6 shows an embodiment of the invention in a telephone 602 with an integrated telephone answering device (TAD) including a conventional TAD functional block 604, AND gate 606, and speaker 608. As in a conventional TAD, if an incoming call is not answered within a predetermined number of rings, an outgoing message (OGM) is issued to the incoming caller via the TLI 111 and PSTN. However, unlike in a conventional TAD, the OGM is not automatically simultaneously played from speaker 608. Instead, according to this embodiment of the invention, the OGM will be played from speaker 608 only if the environmental conditions permit.

In the example of FIG. 6, the environmental conditions that permit the OGM to be played from the speaker are that either the ambient light is greater than the first threshold, or that the ambient noise level is greater than the second threshold. Thus, the embodiment of FIG. 6 uses the same thresholds to determine whether to play the OGM from speaker 608 as are used to determine whether to ring ringer 107. Of course, the OGM decision can be based on thresholds that differ from those used for the ring decision. Further, the OGM decision can be based on environmental factors that differ from those used for the ring decision.

After the OGM is issued to the incoming caller via the TLI 111 and the PSTN, the incoming caller will typically have the option to record a message, for example, in a digital memory space of TAD block 604. Conventionally, such an incoming message is broadcast from speaker 608 as it is being recorded into memory. According to the invention, however, the incoming message will not be broadcast from speaker 608 if the light sensor 501 determines that the light level is below the first threshold and the sound sensor 503 determines that the noise level is below the second threshold. Of course, the decision regarding broadcast of the incoming message need not be identical with the decision regarding the OGM, although it is likely practical for it to be so.

In practice, the invention will likely be employed in a telephone that enables a user to select whether to operate in a conventional manner, whereby ringer 107 rings in response to all incoming calls, or to operate in an environmentally-conscious manner. For example, the user can place a switch in a first position for the telephone to operate in the conventional manner, and can place the switch in a second position for the telephone to operate in the environmentally-conscious manner. Alternatively, the user can press a key sequence on a keypad of the telephone to toggle the selection, in which case a liquid crystal display (LCD) of the telephone may provide an indication of the status of the telephone.

The sensors 109, 501 and 503 can comprise conventional transducers, with the intelligent portions thereof, such as the portions performing comparisons with thresholds, being configured as either hardware, or preferably as a processor, such as a digital signal processor (DSP) programmed to carry out the described functions. Further, such a DSP may also be programmed to serve as the logic gates 115, 505, and 606, as well as the TAD block 604. A typical high-end telephone, such as a telephone with integrated caller ID functionality, and/or integrated TAD functionality, already includes a DSP to perform the high-end functions. Thus, a telephone according to the invention may be implemented by incorporating the transducer(s) necessary to perform the sensing functions and programming the DSP accordingly.

In the above-described embodiments, the thresholds employed in the DSP portion of the sensors 109, 501 and 503, are set at predetermined levels. Alternatively, the thresholds may be programmable, such as by a user setting the thresholds, for example, via a keypad and display of the telephone. Further, the thresholds may be set through a training process by which a user presses a button sequence or otherwise activates a user input device to inform the DSP that the present environmental condition(s) comprise a given threshold. For example, the user may provide ambient light, such as by adjusting a dimmer switch of a light fixture, and instruct the telephone that the present light level constitutes a threshold, such a the first threshold defining a level below which the ringer 107 should not ring. The sensor will thus sense the level and establish it as the appropriate threshold.

Various exemplary embodiments according to the invention having been described herein, one of skill in the art may conceive of obvious alternative embodiments according to the invention. These alternatives, of course, fall within the scope of the invention, which is limited solely by the following claims.

What is claimed is:

1. A telephone, comprising:

a ringer;

a ringing circuit adapted to receive a ringing signal and output a signal to actuate the ringer in response thereto;

a photosensor adapted to sense a level of ambient light and to disable the ringer if the sensed level of ambient light is below a first threshold; and a speaker portion of a telephone answering device, wherein the sensor is further adapted to disable the speaker portion if the sensed level is below the threshold.

2. A telephone, comprising:

ringer;

a ringing circuit adapted to receive a ringing signal and output a signal to actuate the ringer in response thereto;

an acoustic sensor adapted to sense a level of ambient noise; and a photosensor adapted to sense a level of ambient light, and to disable the ringer if the sensed level of ambient light is below a first threshold and the sensed level of ambient noise is below a second threshold.

3. A telephone as recited in claim 2, further comprising:

a speaker portion of a telephone answering device, wherein the sensor is further adapted to disable the speaker portion if the sensed level is below the threshold.

4. A telephone as recited in claim 2, further comprising an alternative indicator, wherein the photosensor is adapted to enable the alternative indicator when it disables the ringer.

5. A telephone as recited in claim 4, wherein the alternative indicator is a light.

6. A method of controlling a sound emanating from a speaker portion of a telephone answering machine, comprising:

sensing at least one of a level of ambient light and a level of ambient noise; and adjusting the speaker portion based on the sensing.

7. A method as recited in claim 6, wherein the adjusting step disables the speaker if the ambient light is below a first threshold.

8. A method as recited in claim 7, wherein the adjusting step also disables the speaker if the ambient noise is below a second threshold.

9. A method as recited in claim 6, wherein the adjusting step disables the speaker if the ambient noise is below a second threshold.

10. A method of responding to a ringing signal, comprising:

sensing a level of ambient light;

sensing a level of ambient noise; and disabling a ringer if the sensed levels are below respective thresholds.

11. A method as recited in claim 10, further comprising the step of enabling an alternative indicator.

12. A method as recited in claim 11, wherein the alternative indicator is a light.

13. A method of responding to a ringing signal, comprising the steps of:

sensing a level of ambient light; and adjusting an audible indicator based on the sensed level of ambient light by muting the audible indicator if the sensed level of ambient light is below a first threshold, setting the audible indicator to a first volume if the sensed level of ambient light is greater than the first threshold but less than a second threshold, and setting the audible indicator to a second volume if the sensed level of ambient light is greater than the second threshold.

14. A method as recited in claim 13, wherein the second volume is greater than the first volume.

* * * * *